United States Patent [19]

Lupien

[11] Patent Number: 6,006,091
[45] Date of Patent: Dec. 21, 1999

[54] SYSTEM AND METHOD OF INFORMING A RADIO TELECOMMUNICATIONS NETWORK OF THE OPERATING CAPABILITIES OF A MOBILE TERMINAL LOCATED THEREIN

[75] Inventor: Francis Lupien, Montreal, Canada

[73] Assignee: Telefonaktiebolaget LM Ericsson (publ), Stockholm, Sweden

[21] Appl. No.: 08/766,211

[22] Filed: Dec. 12, 1996

[51] Int. Cl.$^6$ ............................................. H04Q 7/22
[52] U.S. Cl. ........................ 455/435; 455/419; 455/414
[58] Field of Search .................................. 455/414, 419, 455/435, 433, 458, 518

[56] References Cited

U.S. PATENT DOCUMENTS

| | | | |
|---|---|---|---|
| 5,020,092 | 5/1991 | Phillips et al. | 379/59 |
| 5,020,093 | 5/1991 | Pireh | 379/59 |
| 5,129,097 | 7/1992 | Suzuki et al. | 455/458 |
| 5,228,053 | 7/1993 | Miller et al. | 375/1 |
| 5,228,074 | 7/1993 | Mizikovsky | 379/59 |
| 5,309,474 | 5/1994 | Gilhousen et al. | 375/1 |
| 5,412,375 | 5/1995 | Wood | 340/825.03 |
| 5,519,706 | 5/1996 | Bantz et al. | 455/435 |
| 5,548,586 | 8/1996 | Kito et al. | 455/433 |
| 5,621,784 | 4/1997 | Tiedemann, Jr. et al. | 455/435 |
| 5,629,975 | 5/1997 | Tiedemann, Jr. et al. | 455/435 |
| 5,765,109 | 6/1998 | Chavez, Jr. | 455/435 |
| 5,768,267 | 6/1998 | Raith et al. | 455/435 |

FOREIGN PATENT DOCUMENTS

| | | |
|---|---|---|
| 0685972A3 | 12/1995 | European Pat. Off. . |
| WO 94/30023 | 12/1994 | WIPO . |
| WO 95/35002 | 12/1995 | WIPO . |

*Primary Examiner*—Edward F. Urban
*Assistant Examiner*—Thuan T. Nguyen
*Attorney, Agent, or Firm*—Smith & Danamraj, P.C.

[57] ABSTRACT

A method in a cellular telecommunications network of informing the network of a plurality of operating capabilities of a mobile terminal. The method begins with the steps of entering an access (intermediate) state at the mobile terminal and then transmitting a message from the network to the mobile terminal requesting the mobile terminal to transmit information regarding the operating capabilities of the mobile terminal. The capability request may be sent on a paging channel (PCH) or an access response channel (ARCH). This is followed by transmitting a capability report from the mobile terminal to the network, the capability report including the requested information. The capability report may include all of the capabilities of the mobile terminal, or may include a specified capability set. The method may optionally include the step of determining whether the network has been informed of the operating capabilities of the mobile terminal before transmitting the message from the network to the mobile terminal requesting the mobile terminal to transmit its capabilities information. Additional capabilities, or updated capabilities may be retrieved from the mobile terminal by later transmitting a capability update request to the mobile terminal.

13 Claims, 1 Drawing Sheet

SYSTEM AND METHOD OF INFORMING A RADIO TELECOMMUNICATIONS NETWORK OF THE OPERATING CAPABILITIES OF A MOBILE TERMINAL LOCATED THEREIN

BACKGROUND OF THE INVENTION

1. Technical Field of the Invention

This invention relates to radio telecommunication networks and, more particularly, to a system and method of informing a radio telecommunications network of the operating capabilities, including the frequency band capability, of a mobile terminal operating therein.

2. Description of Related Art

North American cellular telecommunications networks traditionally operate in two frequency bands (A and B) in the 800-MHz hyperband. The most recent evolution in cellular telecommunications involves the adoption of six additional frequency bands (A–F) in the 1900-MHz hyperband for use in handling mobile and personal communications. The 1900-MHz hyperband is also known as the Personal Communication Services (PCS) hyperband. Frequency bands within the 800-MHz hyperband and the 1900-MHz hyperband are defined in EIA/TIA Standard IS-136, which is hereby incorporated by reference herein. Other standards which define cellular telephone operations in North America include EIA-627, EIA-553, and the intersystem signaling standard IS-41 which are also incorporated by reference herein.

Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

Mobile subscribers are now being offered new (optional and non-traditional) services in both the 800-MHz and 1900-MHz hyperbands, in addition to the traditional voice service on the 800-MHz bands. The next generation of digital mobile terminals, base stations, and Mobile Switching Centers (MSCs) must carry new functionalities or capabilities in order to realize these new non-traditional services. In addition, it is desirable to incorporate into the design of new mobile terminals, base stations, and MSCs a capability to optionally implement or not implement new functionalities or capabilities. Therefore, it is critical that new mobile terminals, base stations, and MSCs be informed of each other's ranges of supported capabilities, in order to properly allocate system resources and provide support for given services.

As an example, an existing cellular telephone network may simultaneously support radio telecommunications in multiple frequency hyperbands. A mobile switching center (MSC) within the network may control transmission and reception equipment at a base station to operate one cell in the 800-MHz hyperband and another cell in the 1900-MHz hyperband. Mobile terminals may also be capable of operating in either frequency hyperband. Thus it is critical that the MSC serving a particular mobile terminal be informed of the hyperband and frequency band capability of the mobile terminal, in order to successfully allocate a voice channel in one of the frequency bands supported by the mobile terminal. In addition, the whole range of mobile terminal operating capabilities may be required in order to properly allocate other network resouces necessary to provide requested services.

In existing cellular telephone networks, however, the operating capabilities, including the frequency band capability of a mobile terminal, are sent to the cellular network only in a few specified instances. IS-136 specifies several instances and methods for the mobile terminal to report its capabilities, but the methods do not always provide the information when it is required. There are cases when the information is needed by the network, but the mobile terminal is in a state in which the information cannot be requested. At specified registration cases, the mobile terminal can report its capabilities as information elements sent in system access messages, provided it is directed to do so by including an order in the overhead information sent to the mobile terminal by the network. According to IS-136, the mobile terminal only reports its capabilities at power-up registration, a new system registration, or a forced registration. These cases are limited so that bandwidth on the access channel is not misused, and primarily deal with a mobile terminal's first registration in a system.

There are two other existing methods for the telecommunications network to acquire the operating capabilities of the mobile terminal. The first method is to request the mobile terminal capabilities in a capability request message on the paging channel (PCC) while the mobile terminal is in state "DCCH Camping" or "Idle". Mobile terminal states during call setup are defined in IS-136. This method may be utilized if the network does not already have the mobile terminal capabilities while it has knowledge of the mobile terminal in a given service area. This situation could occur when the capabilities are not reported following a mobile terminal's access in a new service area. This method is best utilized if it is used immediately following a mobile terminal's first access, while the cell location of the mobile terminal is known (for example, following a successful mobile registration access on the DCCH). It should be noted that on the digital control channel (DCCH), a registration access should be the first access in a new service area. This method saves PCH resources by avoiding the sending of the capability request to several PCHs in a wide area (several cells) in an attempt to locate the mobile terminal.

The second method is to send a Capability Update Request message to the mobile terminal on the Fast Associated Control Channel (FACCH). This method is utilized when the mobile terminal has gained access to a digital traffic channel (DTC), while the network does not already have the required mobile terminal capabilities to continue with the processing of the call, and for handling call related events that may be required during the duration of the call. This method allows the retrieval of capabilities that are not provided in the capability report or are not available in any way from a call access for a specific service. In addition, a limited subset of the capabilities normally provided by the first method may be retrieved.

Before the mobile terminal receives a page, or before it makes an origination or any other type of access, the mobile terminal is in state "Idle". At that point, as noted above, it is possible to utilize the capability request on the PCH if the location of the mobile terminal is known in a particular service area. However, if the exact cell location of the mobile terminal is not known, a wide area paging must be performed to locate the subscriber. This process utilizes paging capacity and can only be avoided by using the first method described above immediately after the mobile terminal's registration access in a new service area.

A major disadvantage of these existing methods for the cellular network to acquire the operating capabilities of the mobile terminal is that there are instances when the cellular network needs to know the operating capabilities of a mobile terminal to properly allocate resources, but the network cannot obtain that information. In some of the mobile terminal call-setup states defined in IS-136, the mobile terminal cannot receive a capabillities request message and, therefore, cannot report its operating cabilities to the network. For example, when the mobile terminal has responded to a page and is in state "waiting for order", or after the mobile terminal makes an origination call and is in state "origination proceeding", the IS-136 standard does not allow the network to send the capability request message. In fact, IS-136 does not allow the capability request message to be sent in any of the defined mobile terminal states on the DCCH other than state "DCCH camping". Therefore, utilization of the first method above is limited because the capability request message cannot be sent to the mobile terminal while the terminal is in an intermediate traffic state after an initial access. The intermediate traffic states are registration proceeding, Shared Secret Data (SSD) update proceeding, origination proceeding, originated point-to-point teleservice proceeding, waiting for order, user group alerting, and terminated point-to-point teleservice proceeding.

In other words, the capability request message cannot be sent to the mobile terminal while the terminal is between any of the access states (registration proceeding, origination proceeding, waiting for order, etc.) and the idle state. It is critical that the network have the mobile terminal's capabilities before assigning resources such as a voice channel. Capabilities such as supported bands, DTC rate support, alternate/allowed voice coders for voice channel allocation, SOC or alternate system operator code (SOC) support, base station manufacture code (BSMC) support, protocol version, 800 MHz analog speech, etc. must be known by the network to properly allocate resources. If the network does not have this information, it makes arbitrary choices, which may be inefficient or incorrect.

In addition, mobile terminals capable of operating in either the 800-MHz hyperband or in the 1900-MHz hyperband may be tuned to digital control channels (DCCHs) in different hyperbands at different times. The serving MSC knows of the last known DCCH-hyperband used by the mobile terminal at system access. This information is normally used to page the mobile terminal on the DCCH in the appropriate hyperband. It may be useful in some cases to page the mobile terminal in all of the hyperbands which the mobile terminal supports, for instance, when the mobile terminal cannot be located using the last known hyperband. However, IS-136 does not allow for updating the DCCH-hyperband information for mobile terminals except at the specified registration cases. Therefore, cases may arise in which the network needs the hyperband capability to page the mobile terminal, but the information was not reported by the mobile terminal in the latest registration or other type of system access. If the network does not have this information, the call completion rate to subscribers may be reduced.

Although there are no known prior art teachings of a solution to the aforementioned deficiency and shortcoming such as that disclosed herein, U.S. Pat. No. 5,020,092 to Phillips et al. (Phillips) and U.S. Pat. No. 5,020,093 to Pireh (Pireh) discuss subject matter that bears some relation to matters discussed herein. Phillips and Pireh both disclose a dual-bandwidth cellular telephone that automatically switches its receiver bandwidth and control program for operation on a second cellular telephone system when service on a first system is not available. Phillips and Pireh do not teach or suggest a mechanism or method in a cellular telephone network for informing the network of the hyperband capability of mobile terminals attempting to access the network, or for updating the DCCH-hyperband information for mobile terminals.

Review of each of the foregoing references reveals no disclosure or suggestion of a system or method such as that described and claimed herein.

In order to overcome the disadvantage of existing solutions, it would be advantageous to have a cellular telephone network with a mechanism for informing the network of the mobile capabilities of a mobile terminal before the mobile terminal responds to a page or makes an origination call in the network. In addition, the network would have a mechanism for updating the DCCH-hyperband information for mobile terminals operating therein. The present invention provides such a network.

SUMMARY OF THE INVENTION

In one aspect, the present invention is a method in a cellular telecommunications network, of informing the network of a plurality of operating capabilities of a mobile terminal. The method begins with the steps of entering an access (intermediate) state at the mobile terminal and then transmitting a message from the network to the mobile terminal requesting the mobile terminal to transmit information regarding the operating capabilities of the mobile terminal. This is followed by transmitting a capability report from the mobile terminal to the network, the capability report including the requested information. The capability report may include all of the capabilities of the mobile terminal, or may include a specified capability set. The method may optionally include the step of determining whether the network has been informed of the operating capabilities of the mobile terminal before transmitting the message from the network to the mobile terminal requesting the mobile terminal to transmit its capabilities information. Additional capabilities, or updated capabilities may be retrieved from the mobile terminal by later transmitting a capability update request to the mobile terminal.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
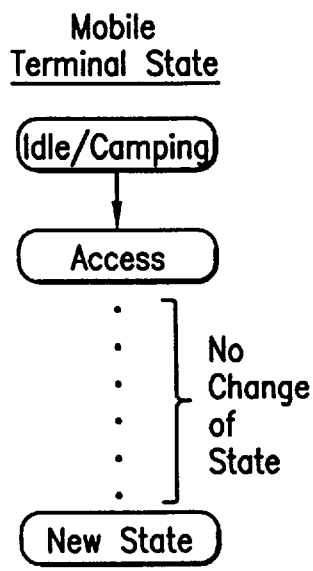
FIG. 1 is a message flow diagram illustrating the flow of messages between a mobile terminal and a radio telecommunication network when retrieving mobile terminal capabilities information upon network access by the mobile terminal, other than a response to a termination, in accordance with the teachings of the present invention.
Figure 1:
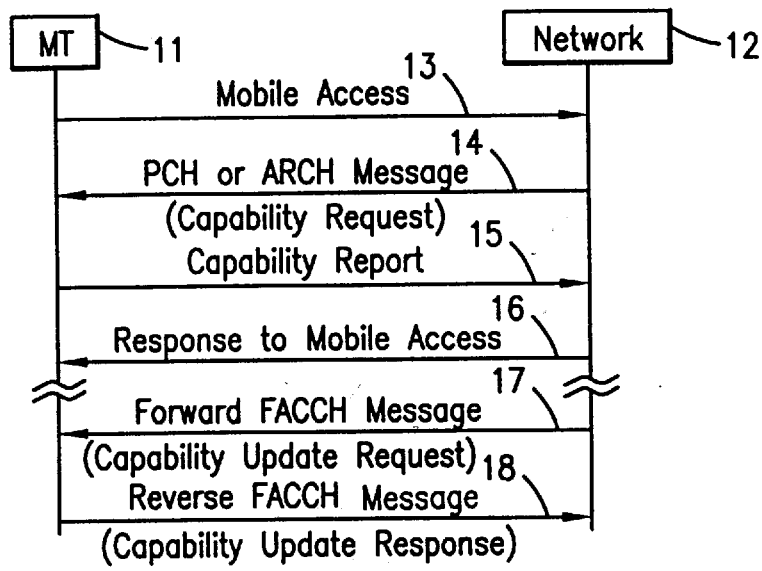

It is critical that new mobile terminals, base stations, and MSCs be informed of each other's ranges of supported capabilities, in order to provide support for new, non-traditional services. For example, a MSC may control several base stations transmitting in several hyperbands. These base stations, together and in coordination with the MSC, may implement a series of optional capabilities in order to provide services. These capabilities are usually communicated to mobile terminals operating within the network by broadcasting an appropriate system information message or using a FACCH capability update request to the network. A mobile terminal may be capable of supporting several hyperbands and bands in addition to optional underlying capabilities for given services. The MSC must be informed of the capabilities that the mobile terminal supports, and vice versa, in order to efficiently allocate resources and provide services when invoked by a subscriber or by the network. This is because different resources are utilized in the network and the mobile terminal in order to implement a requested service. These resources include voice channels in a particular hyperband and bands, bandwidth on that particular channel (i.e., full rate, double full rate, triple full rate, etc.), as well as voice coders, specific types of trunks (i.e., analog or digital), interworking functions, etc.

The present invention removes the limitations on the current mobile terminal capability reporting procedures on the DCCH by allowing the capability request message to be sent to a mobile station while in an intermediate traffic state following a system access. As noted above, the intermediate traffic states are registration proceeding, Shared Secret Data (SSD) update proceeding, origination proceeding, originated point-to-point teleservice proceeding, waiting for order, user group alerting, and terminated point-to-point teleservice proceeding. In order to optimize resource allocation at call setup, the mobile terminal's operating capabilities retrieved from the terminal are used as parameters input to resource allocation such as voice channel selection. Capabilities such as the terminal hyperband capability are made available at mobile call access while the mobile terminal is either in state Origination Proceeding or Waiting for Order (after page response but before channel designation) by introducing a new message on the paging channel (PCH) or the access response channel (ARCH). A similar implementation utilizes signaling on the Digital Traffic Channel (DTC). The messages utilize little bandwidth if they request only the terminal hyperband capability rather than all mobile terminal capabilities.

The retrieval message may be a proprietary signaling message that is sent to mobile terminals programmed for this message, but is transparent to other mobile terminals. The message may also be a new message which can discriminantly request the frequency band capability or another subset of mobile terminal capabilities that are identified in the message. Alternatively, an existing Capabilities Request message may be utilized to request all of the capabilities of the mobile terminal. This alternative, however, utilizes more control channel bandwidth.

A Capability Report is returned from the mobile terminal in response to the Capabilities Request message sent to the mobile terminal on the PCH or the ARCH, or at specific registration accesses. The Capability Report may include the mobile terminal capabilities shown in Table 1 below. The table may be expanded as new mobile terminal capabilities are added to the IS-136 standard.

TABLE 1

MOBILE TERMINAL CAPABILITIES

| | |
|---|---|
| Protocol Version | Subaddressing Support |
| SCM | Supported Frequency Bands |
| Software Vintage | IRA Encoding Support |
| Firmware Vintage | User Group Support |
| Model Number | 800 MHz Analog Speech Support |
| Manufacturer's Code | Half Rate DTC Support |
| MAX_SUPORTED_PFC | Double Rate DTC Support |
| SOC Support | Triple Rate DTC Support |
| BSMC Support | STU-III Support |
| Asynch Data Support | Subaddress: Optional |
| G3-Fax Support | Voice Code Map Info (Optional) |
| SMS Broadcast Support | ALT_SOC Support (Optional) |

The network may also send the mobile terminal a Capability Update Request on the forward Fast Associated Control Channel (FACCH). The mobile terminal responds with a Capability Update Response on the reverse DTC using the FACCH. Many of the mobile terminal capabilities reported in the Capability Update Response are not included in the basic Capability Report, and may be complementary capabilities. The Capability Update Response may include the mobile terminal capabilities shown in Table 2 below. The table may be expanded as new mobile terminal capabilities are added to the IS-136 standard.

TABLE 2

MOBILE TERMINAL CAPABILITIES

| | |
|---|---|
| Protocol Version (PV) | BSMC |
| Voice Privacy Mode (VPM) Map | SMS Map |
| Voice Coder (VC) Mode Map | IRA Encoding Support |
| Message Encryption Key (MEK) Map | Supported Frequency Bands |
| FACCH/SACCH ARQ Map | 800 MHz Analog Speech Support |
| SOC | Message Encription Algorithm (MEA) Map |

The mobile terminal may also send a Capability Update Request to the BS/MSC on the reverse FACCH. The BS/MSC responds with a Capability Update Response on the forward DTC using the FACCH. The Capability Update Response may include the BS/MSC capabilities shown in Table 3 below. The table may be expanded as new mobile terminal capabilities are added to the IS-136 standard.

TABLE 3

BASE STATION/MSC CAPABILITIES

| | |
|---|---|
| Protocol Version (PV) | SOC |
| Voice Privacy Mode (VPM) Map | BSMC |
| Voice Coder (VC) Mode Map | SMS Map |
| Message Encryption Key (MEK) Map | IRA Encoding Support |
| FACCH/SACCH ARQ Map | Message Encription Algorithm (MEA) Map |

The mobile terminal requests the BS/MSC capabilities on the FACCH to help evaluate which of the VPM, VC, MEK, MEA, SMS, FACCH/SACCH ARQ, and IRA services it has in common with the BS/MSC in order to interpret handling of the FACCH/SACCH, to determine which SMS service can be invoked, to determine which VC, VP, MEK, MEA services can be requested/changed, and to determine which address fields IRA or BCD should be encoded, etc.

As noted above, the present invention removes the limitations on the current mobile terminal capability reporting procedures on the DCCH by allowing the capability request message to be sent to a mobile station while in an intermediate traffic state following a system access. While the mobile terminal is in an intermediate state, the mobile terminal listens to the F-DCCH on its paging subchannel or its SMS point-to-point channel (SMSCH), paging channel (PCH), or access response channel (ARCH) (collectively, SPACH), and is able to receive any type of SPACH messages.

The process of retrieving the capabilities of the mobile terminal on the DCCH may be made more efficient. For example, if the mobile terminal is in state DCCH camping, when entering a new mobile switching center (MSC) service area, the mobile terminal is most likely to issue a registration as a first access, but not necessarily the type of registration that includes the capability report. In this case, it is more efficient to retrieve the capabilities while the mobile terminal is in state "registration proceeding" instead of waiting until a registration accept response completes the registration procedure.

In the present invention, the network obtains mobile terminal capabilities information by sending a capability request message following a mobile access from the mobile terminal. The capability request may be handled as either a PCH or an ARCH message. The ARCH message is preferred since it utilizes less downlink bandwidth. In a PCH message, the message is transmitted twice per hyperframe because the PCH subchannel is present in each of the two superframes of a hyperframe. This is not the case for an ARCH message because the ARCH subchannel is not repeated in both superframes.

In the intermediate states noted above, the mobile terminal always monitors the SPACH, and upon a "Layer 2 Access Success Indication", determines whether the layer 2 frame is an ARCH or a PCH message. Depending on the mobile terminal state, the IS-136 standard allows only some ARCH and PCH messages to be received by the mobile terminal. The present invention allows the capability request message to be received and responded to by the mobile terminal regardless of the state. If a capability request message is received, the mobile terminal first determines whether the message is intended for it in accordance with the Subaddressing Procedures. If the message is intended for the mobile terminal, it issues a Reverse Digital Control Channel (RDCCH) Request primitive containing a Capability Report according to the specified capability set. The mobile terminal remains in its existing state.

The capability request message may discriminantly request only the capabilities needed in specific traffic cases, in order to increase the efficiency of the retrieval process and to obtain needed capability information without utilizing too much bandwidth. A discrimination process is utilized for requesting and returning either a subset of capabilities or all of the capabilities at once. Only the necessary capabilities are retrieved for a given access type (for example, supported frequency bands at call access). In one exemplary embodiment, an optional "capability set" information element is included in the capability request message. The capability set information element comprises a bit map of all possible capabilities (one bit for each capability). The mobile terminal returns the requested capabilites in the order in which they are requested in the capability request message. Both time and bandwidth savings are achieved by limiting the number of layer 2 frames utilized for both the capability request and report, especially when re-transmission of some frames is required. When mobile terminals are in any of the intermediate states, specific timers are utilized to control the process.

FIG. 1 is a message flow diagram illustrating the flow of messages between a mobile terminal 11 and a radio telecommunication network 12 when retrieving mobile terminal capabilities information upon network access by the mobile terminal, other than a response to a termination, in accordance with the teachings of the present invention. The mobile terminal 11 is initially in the Idle or the Camping state. The mobile terminal then sends a mobile access 13 to the network 12 and enters an Access state. The mobile access 13 may be a call origination, a SMS origination (R-data), or a registration. The Access state may be registration proceeding, origination proceeding, or originated point-to-point teleservice proceeding.

The network 12 then sends a capability request to the mobile terminal 11 in the form of a PCH or ARCH message 14. The mobile terminal first determines whether the message is intended for it, and if so, determines the capability set specified in the capability request message 14. The mobile terminal then returns a capability report 15 to the network according to the specified capability set. The mobile terminal remains in the Access state until a response to the mobile access is received at 16.

After the mobile terminal is connected to the DTC, the network 12 may transmit to the mobile terminal 11, a capability update request utilizing a forward FACCH message 17. The mobile terminal responds by sending the network a capability update response utilizing a reverse FACCH message 18. The capability update response may include mobile terminal capabilities that are not reported in the basic capability report 15.

Figure 2:
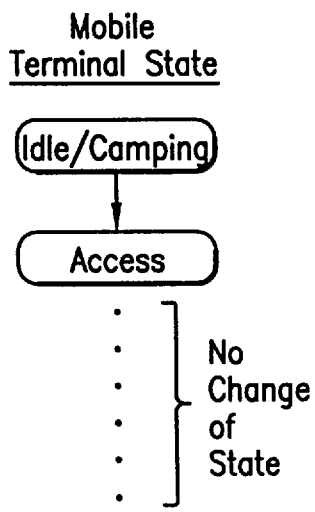
FIG. 2 is a message flow diagram illustrating the flow of messages between a mobile terminal and a radio telecommunication network when retrieving mobile terminal capabilities information upon a termination to the mobile terminal in accordance with the teachings of the present invention.
Figure 2:
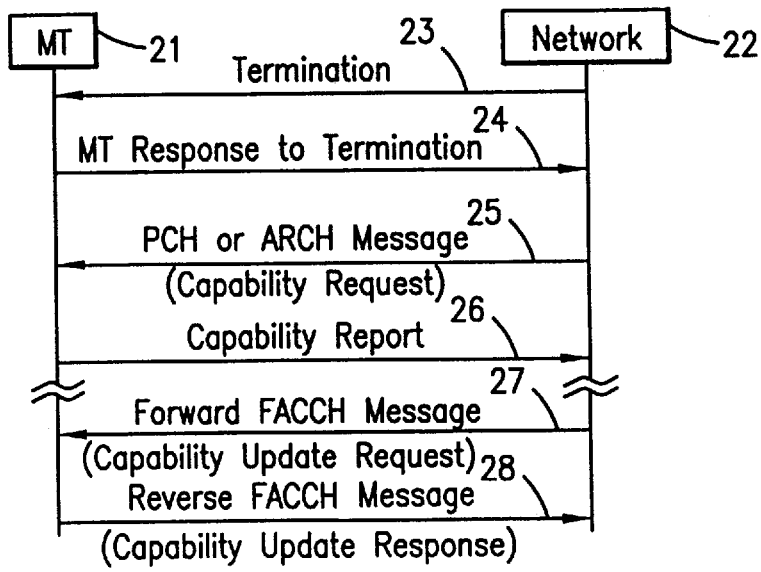

FIG. 2 is a message flow diagram illustrating the flow of messages between a mobile terminal 21 and a radio telecommunication network 22 when retrieving mobile terminal capabilities information upon a termination to the mobile terminal in accordance with the teachings of the present invention. The mobile terminal 21 is initially in the Idle or the Camping state. The network then sends a termination 23 to the mobile terminal, and the mobile terminal enters an Access state. The termination 23 may be a page or hard page, a SPACH notification (page, Shared Secret Data (SSD) update, R-data, or queue update), or SSD update order. The Access state may be waiting for order, terminated point-to-point teleservice proceeding, or SSD update proceeding. The mobile terminal sends a response to the termination at 24. The response 24 may be a page response, SPACH confirmation, or base station challenge order.

The network 22 then sends a capability request to the mobile terminal 21 in the form of a PCH or ARCH message 25. The mobile terminal first determines whether the message is intended for it, and if so, determines the capability set specified in the capability request message 25. The mobile terminal then returns a capability report 26 to the network according to the specified capability set. The mobile terminal remains in the Access state.

After the mobile terminal is connected to the DTC, the network 22 may transmit to the mobile terminal 21, a capability update request utilizing a forward FACCH message 27. The mobile terminal responds by sending the network a capability update response utilizing a reverse FACCH message 28. The capability update response may include mobile terminal capabilities that are not reported in the basic capability report 26.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. In a cellular telephone network, a method of informing the network of a plurality of operating capabilities of a mobile terminal, said method comprising the steps of:

entering an intermediate traffic state at said mobile terminal following a system access by said mobile terminal, the intermediate traffic state being selected from the group consisting of registration proceeding, Shared Secret Data (SSD) update proceeding, orignation proceeding, orginated point-to-point teleservice proceeding, waiting for order, user group alerting, and terminated point-to-point teleservice proceeding;

transmitting a message from said network to said mobile terminal while said terminal is in the intermediate traffic state requesting the mobile terminal to transmit information regarding the operating capabilities of said mobile terminal; and transmitting a capability report from said mobile terminal to said network while said terminal is in the intermediate traffic state, said capability report including said requested information.

2. The method of informing a cellular telephone network of a plurality of operating capabilities of a mobile terminal of claim 1 further comprising, before the step of transmitting a message from said network to said mobile terminal requesting the mobile terminal to transmit information regarding the operating capabilities of said mobile terminal, the step of determining whether said network has been informed of the operating capabilities of said mobile terminal.

3. The method of informing a cellular telephone network of a plurality of operating capabilities of a mobile terminal of claim 1 wherein said step of transmitting a message from said network to said mobile terminal requesting the mobile terminal to transmit information regarding the operating capabilities of said mobile terminal includes the steps of:

programming said mobile terminal to receive a proprietary signaling message requesting said capabilities information; and transmitting said proprietary signaling message requesting said capabilities information to said mobile terminal.

4. The method of informing a cellular telephone network of a plurality of operating capabilities of a mobile terminal of claim 1 wherein said step of transmitting a message from said network to said mobile terminal requesting the mobile terminal to transmit information regarding the operating capabilities of said mobile terminal includes transmitting a capability request message to the mobile terminal on a paging channel.

5. The method of informing a cellular telephone network of a plurality of operating capabilities of a mobile terminal of claim 1 wherein said step of transmitting a message from said network to said mobile terminal requesting the mobile terminal to transmit information regarding the operating capabilities of said mobile terminal includes transmitting a capability request message to the mobile terminal on an access response channel.

6. The method of informing a cellular telephone network of a plurality of operating capabilities of a mobile terminal of claim 5 wherein said step of transmitting a capability request message to the mobile terminal on an access response channel includes identifying for retrieval in said capability request message, a subset of the operating capabilities of said mobile terminal.

7. The method of informing a cellular telephone network of a plurality of operating capabilities of a mobile terminal of claim 1 further comprising the steps of:

transmitting a capabilities update request message from said network to said mobile terminal requesting the mobile terminal to transmit to the network the mobile terminal's current operating capabilities information; and transmitting the mobile terminal's current operating capabilities information from said mobile terminal to said network.

8. The method of informing a cellular telephone network of a plurality of operating capabilities of a mobile terminal of claim 7 wherein said step of transmitting the mobile terminal's current operating capabilities information from said mobile terminal to said network includes transmitting information on mobile terminal capabilities that are not included in said capability report.

9. The method of informing a cellular telephone network of a plurality of operating capabilities of a mobile terminal of claim 1 wherein said step of entering an intermediate traffic state at said mobile terminal includes entering an intermediate traffic state selected from the group consisting of:

registration proceeding;

Shared Secret Data (SSD) update proceeding;

origination proceeding;

originated point-to-point teleservice proceeding;

waiting for order;

user group alerting; and terminated point-to-point teleservice proceeding.

10. The method of informing a cellular telephone network of a plurality of operating capabilities of a mobile terminal of claim 1 wherein said step of transmitting a message from said network to said mobile terminal requesting the mobile terminal to transmit information regarding the operating capabilities of said mobile terminal includes transmitting a request for a specified capability set.

11. The method of informing a cellular telephone network of a plurality of operating capabilities of a mobile terminal of claim 10 wherein said step of transmitting a capability report from said mobile terminal to said network includes transmitting a Reverse Digital Control Channel (RDCCH) request primitive containing said capability report, according to the specified capability set.

12. The method of informing a cellular telephone network of a plurality of operating capabilities of a mobile terminal of claim 1 further comprising, after the step of transmitting a message from said network to said mobile terminal requesting the mobile terminal to transmit information regarding the operating capabilities of said mobile terminal, the step of determining, at said mobile terminal, whether said message from said network is addressed to said mobile terminal.

13. The method of informing a cellular telephone network of a plurality of operating capabilities of a mobile terminal of claim 1 wherein the step of transmitting a capability report from the mobile terminal to the network includes transmitting a capability report which includes supported frequency bands and other mobile terminal operating capabilities selected from the group consisting of digital traffic channel (DTC) rate support, allowed voice coders, system operator code (SOC) support, base station manufacture code (BSMC) support, protocol version, 800 MHz analog speech support, asynchronous data support, G3 Fax support, and short message service (SMS) broadcast support.

* * * * *